United States Patent Office 3,543,203
Patented Nov. 24, 1970

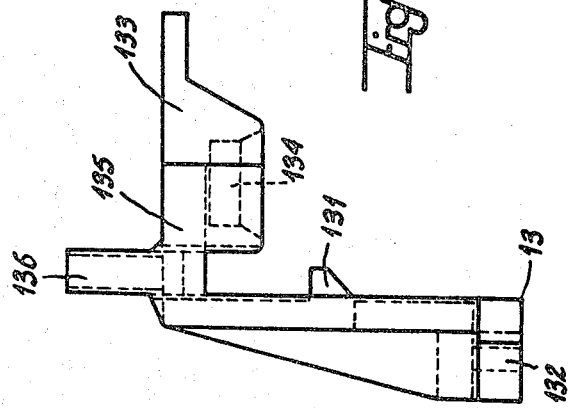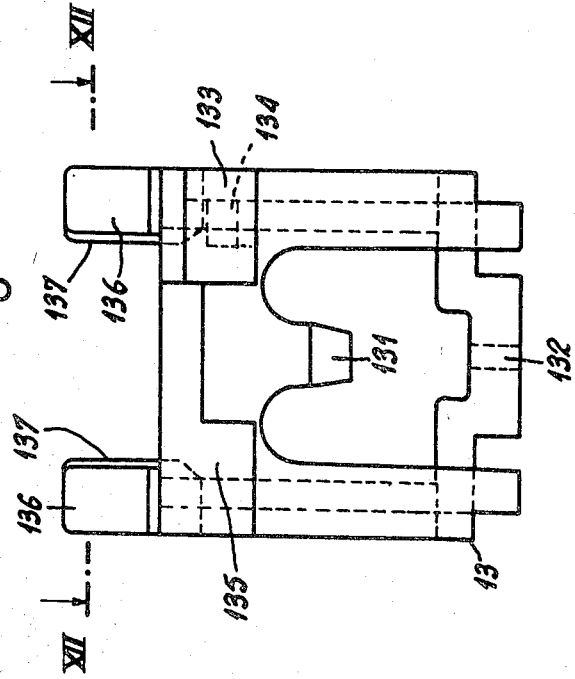

3,543,203
ELECTRO-MAGNETIC ULTRA-SENSITIVE TRIPPING DEVICES
Jean Alletru, Villemomble, France, assignor to L'Industrie Electrique de la Seine, Romainville, Seine-Saint-Denis, France
Filed Aug. 8, 1968, Ser. No. 751,116
Claims priority, application France, Aug. 11, 1967, 117,805
Int. Cl. H01f 7/08
U.S. Cl. 335—229       7 Claims

ABSTRACT OF THE DISCLOSURE

An electro-magnetic tripping device comprises a stator of magnetic material in the shape of a U with two legs and a base. A tripping coil surrounds one leg of the stator and a permanent magnet is mounted in the interior of the U against the second leg of the stator with one pole against the base of the stator. A blade of magnetic material is applied in its normal position against the extremities of the two legs of the stator to form a magnetic circuit therewith and a spring acts on the blade to urge the same to a position of release. A shunt of magnetic material is slidably mounted in an adjustable manner along the permanent magnet and parallel to the legs of the stator, the material of the shunt having an incremental permeability which decreases slightly with increasing field intensity so that the shunt counterbalances variation of reluctance of the magnetic circuit with respect to temperature in order to nullify thermal instability of the tripping device.

---

The invention relates to electro-magnetic tripping devices of the so-called armature-detachment type of relay.

In this type of relay, the moving armature is held magnetically attracted, in the normal position, against two pole faces of a magnetic circuit by a portion of the magnetic flux generated by a permanent magnet cooperating with this magnetic circuit, the other portion of this flux—generally the greater part—being shunted by a portion of the magnetic circuit and having a suitable reluctance. The detachment of the moving armature, which produces the desired mechanical effect (for example actuation of contacts or operation of a circuit-breaker lock), is effected by diminution of the flux circulating in the moving armature, by means of one or a number of windings mounted on the magnetic circuit.

The moving armature then yields to the action of a spring.

As will be indicated in detail later, tripping devices of this type have the considerable disadvantage of being particularly sensitive to temperature, which causes substantial changes in their point of release.

The invention has for its object to overcome this disvantage.

On the other hand, as will be indicated in detail below, tripping devices of this kind have the considerable disadvantage of being subject, as from one relay to another to irregular variations of the point of release.

The present invention has also for its object to eliminate this further disadvantage.

Finally, the invention has also for its object to improve the reliability of the tripping device and its immunity to external magnetic fields, and also to make the tripping device economical in cost and construction.

Briefly, the tripping device according to the invention comprises, in a manner known per se a fixed magnetic circuit (stator) with a permanent magnet and a coil, and a moving armature (blade) closing the said magnetic circuit in its normal position, with a spring tending to pull it away. The stator is of generally U-shape, the coil surrounding one of the legs of the U, and the permanent magnet being housed in the interior of the U, against the second leg of the U with one pole against the base of the U. According to the invention, a magnetic shunt is adapted to slide in an adjustable manner, parallel to the legs of the U along the permanent magnet. If this magnetic shunt is brought close to the base of the U, it shunts the permanent magnet and reduces the flux which circulates in the blade, while on the contrary, if this magnetic shunt is brought nearer to the blade it increases the flux circulating in the blade, the range of adjustment of the point of release thus obtained being therefore considerable.

In addition, the shunt protects the magnet against external stray fluxes. On the other hand, according to a further arrangement of the invention, the dimensions of this shunt and the material of which it is made are chosen so as to obtain, by the incremental permeability of the shunt, a thermal compensation of the point of release of the tripping device.

According to still another arrangement of the invention, the blade which pivots on the edge of the second leg of the U, when released, is guided by two tenons of non-magnetic material placed in two slots of the blade, on each side of the said edge. This non-magnetic guiding eliminates any air-gap together with its undesirable variations.

A preferred construction of the invention which comprises the above arrangements together with other arrangements according to the invention, will now be described with reference to the accompanying drawings given by way of examples and not in any limitative sense.

In these drawings:

FIG. 10 is a side elevation view of the stator of the tripping device shown in FIG. 5;

FIG. 11 is an end elevation view of the non-magnetic plate of the tripping device shown in FIG. 5; and FIG. 12 is a cross-section taken along line XII—XII of FIG. 11, showing the tenons of the plate.

Figure 1:
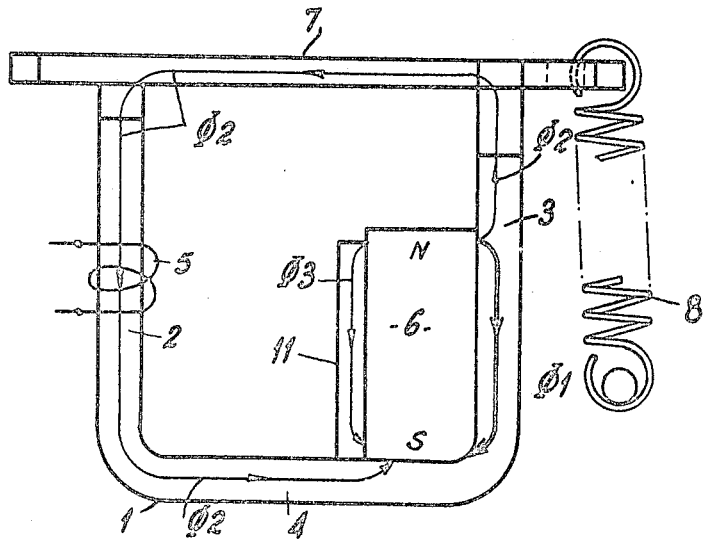
FIGS. 1 and 2 are two diagrammatic illustrations showing the principle of the movable shunt according to the invention at the two extreme positions of adjustment, FIG. 1 corresponding to the minimum useful flux and FIG. 2 to the maximum.
Figure 2:
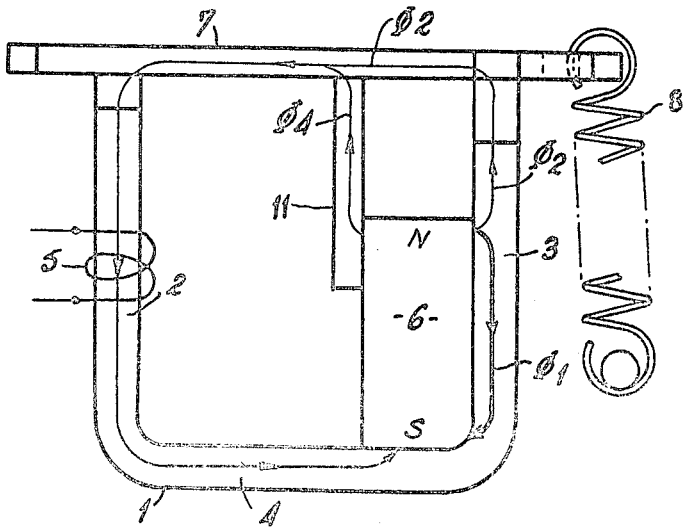

Referring now to FIGS. 1 and 2, the tripping device according to the invention comprises a fixed magnetic circuit 1 (stator) generally of U-shape, with two legs 2 and 3 and a base 4; a coil 5 surrounds the leg 2. A permanent magnet 6 is housed inside the U, against the leg 3 with one pole, for example the South pole as shown, against the base 4 of the U.

The moving armature 7 (blade) closes the magnetic circuit in the normal position (that shown in the figures), in which it is held applied against the legs of the U by magnetic attraction. The magnetic flux produced by the permanent magnet 6 as to the largest portion $\varphi 1$, passes directly from the North pole to the South pole through the leg 3. The useful flux $\varphi 2$ follows the top of the leg 3, the blade 7, the leg 2 and the base 4, and it is this useful flux $\varphi 2$ which holds the blade 7 applied against the legs 2 and 3. The release is obained in known manner by suitably exciting the coil 5, which reduces the useful flux $\varphi 2$ and the blade 7 yields to the force of a spring 8.

According to the invention, a shunt 11 of magnetic material is arranged to slide in an adjustable manner parallel to the legs 2 and 3, along the permanent magnet 6, FIGS. 1 and 2 showing the extreme positions of this adjustment.

In FIG. 1, the shunt 11 is in contact with the base 4 of the U and it thus shunts directly from one pole to the other of the magnet 6, a flux $\varphi 3$ which is taken from the useful flux $\varphi 2$. On the other hand, in FIG. 2, the shunt 11 is in contact with the blade 7 and it channels a flux $\varphi 4$ which is added to the useful flux $\varphi 2$. It will be noted that, as already stated, the range of adjustment of the useful flux $\varphi 2$ thus obtained is considerable and makes it possible to obtain exactly the desired point of release for each tripping device, in spite of the inevitable variations in manufacture. In addition, the arrangement of the moving shunt 11 according to the invention effectively protects the permanent magnet 6 against stray fields of external origin.

Figure 3:
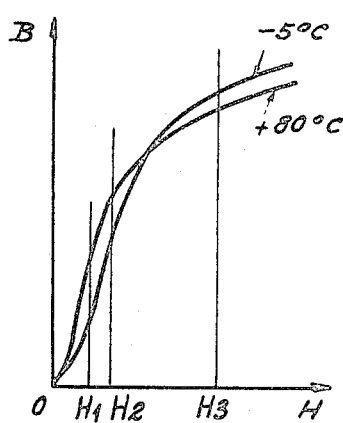
FIG. 3 is an explanatory graph, showing curves of the magnetic induction B as a function of the magnetic field H at temperatures of −5° C. and +80° C.
Figure 4:
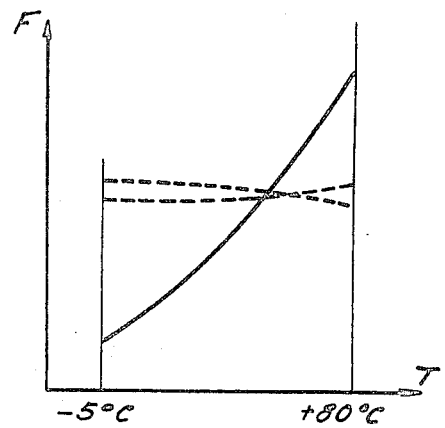
FIG. 4 is a graph showing the thermal deviation of the holding force of the blade in the contact position (drawn in full line), and the thermal deviation of a tripping device according to the invention (drawn in broken line)
Figure 7:
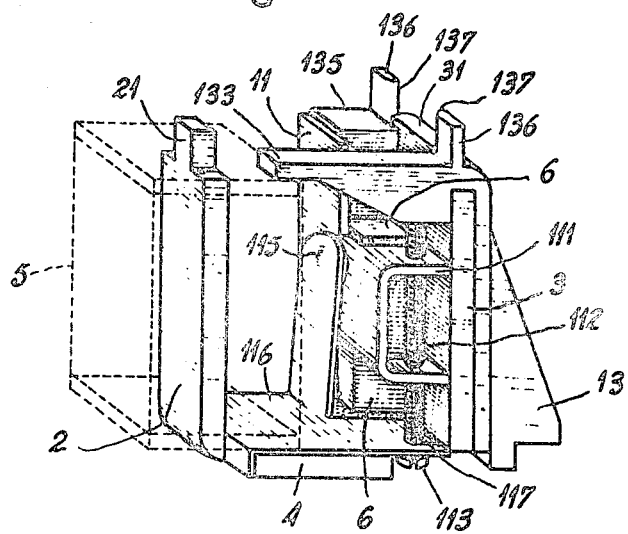
FIG. 7 is a perspective view of the tripping device according to FIG. 5, without blade or coil, in order to show more clearly the relative positions of certain parts.
Figure 9:
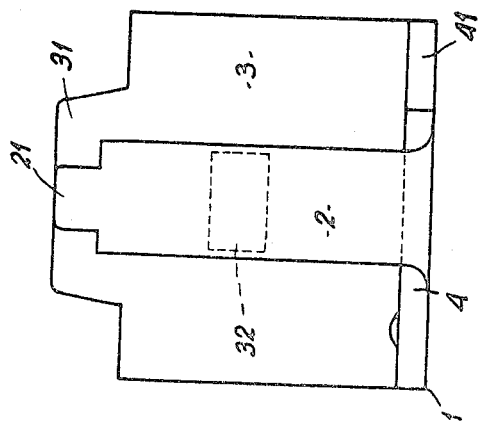
FIG. 9 is an end elevation view of the stator of the tripping device shown in FIG. 5.
Figure 8:
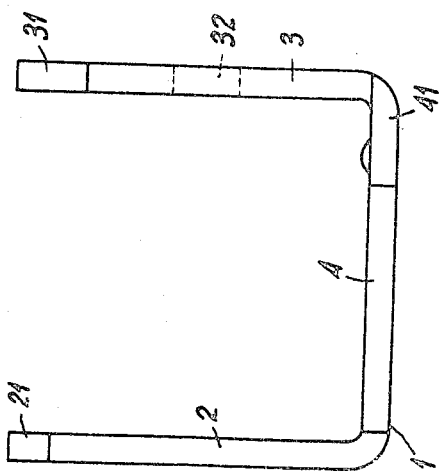
FIG. 8 is a side elevation view of the stator of the tripping device shown in FIG. 5.

As well known and as shown in FIG. 3, in a conventional ferromagnetic material, the magnetic flux density B varies in terms of the magnetic field H according to the temperature, and hence between $-5°$ C. and $80°$ C. for a weak field such as $H_1$ the flux density doubles in value whereas for a fairly moderate field such as $H_2$ the flux density B still increases substantially, while for an intense field such as $H_3$, the flux density B decreases slightly. In the construction of the tripping device in FIGS. 1 and 2, only the flux $\varphi 1$ (in the limbs of the U against which the permanent magnet 6 is applied) is comparatively large, and the useful flux $\varphi 2$ (in the armature 7, legs 2 of the U, and base 4 of the U) is comparatively low. Thus, in the absence of the shunt 11 as the temperature increases, the flux $\varphi 1$ decreases slightly and the useful flux $\varphi 2$ increases greatly. The situation is tantamount to that in which the reluctance in the magnetic circuit (armature 7, legs 2) is decreasing intensely with temperature and the force F which keeps the armature 7 against the legs 2 increases considerably with temperature, as shown by the solid-line curve in FIG. 4. In other words, the magnetic trip flux generated by coil 5 will be applied simultaneously with the useful flux $\varphi 2$ to a magnetic circuit whose incremental permeability decreases greatly by reason of the intense increase of flux $\varphi 2$ when the temperature rises; tripping thus requires more and more current in coil 5, which constitutes the thermal instability whose elimination is the object of the invention.

If now there is added the shunt 11 made of a material whose incremental permeability decreases slightly when the continuous field increases (e.g. Anhyster, a nickel-iron alloy), two advantageous effects are obtained. The first of these is that the shunt 11, as such, shunts onto itself a part of the said increase in useful flux $\varphi 2$ as temperature rises, and this all the more so as its intrinsic incremental permeability decreases much less than that of the U. The second favorable effect, of greater importance than the first, is that this shunt, because its incremental permeability decreases slightly, counteracts the drop in incremental permeability of the magnetic circuit when the useful flux $\varphi 2$ increases as a consequence to the temperature rise. The aforesaid increase of tripping current in coil 5 is thus reduced or even eliminated as shown by the broken-line curves in FIG. 4. By careful dimensioning of the trip units, i.e. by selecting the sectional area and length of the shunt in terms of the dimensions of the armature and U-core, the shunt provides a means of nullifying the thermal instability of the tripping device.

Figure 5:
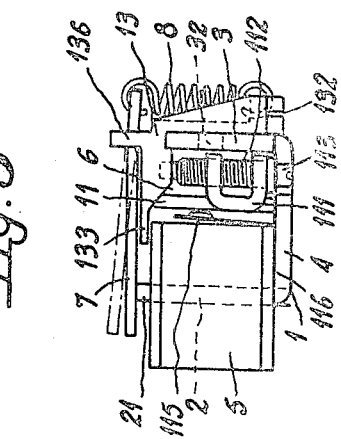
FIG. 5 is an elevation view of the tripping device according to the invention.
Figure 6:
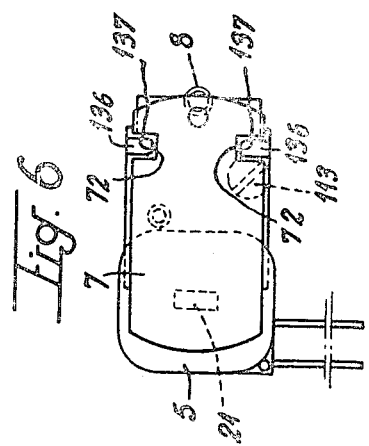
FIG. 6 is a plan view of the tripping device.

Referring now to FIGS. 5 to 12, the parts already described can again be seen with the same references. The leg 2 of the stator 1, of smaller width than the base 4 (FIG. 9), terminates in a narrow portion 21 of still smaller width, on which the blade 7 is supported in its normal position (FIG. 5). The leg 3 terminates in a narrower portion 31, of smaller width than the base 4 (FIG. 9) on which the blade 7 oscillates.

The adjustable shunt 11 is rigidly fixed to a stirrup 111 which can be regulated in height by a screw 112, the head 113 of which is accessible through a slot 41 from the base 4 of the stator. The adjustable shunt 11 is supported against the permanent magnet 6 (FIG. 7) by the head 115 of a spring blade 116 housed between the base 4 and the coil 5; the blade 116 is provided with a cut-away portion 117 which forms a supporting point for the screw 112.

A plate 13 of non-magnetic material, for example moulded in plastic (FIGS. 10 and 11) is mounted on the leg 3 of the stator (FIG. 7), and is locked in position by a nose 131 which falls into a cut-out portion 32 of the leg 3. The plate 13 is provided at the bottom with a drilled hole 132, in which is hooked the spring 8 of the blade 7, and it is provided at the top, on the side of the stirrup 111, with a shoulder 133 which is supported on the top of the coil 5 and is provided with a blind hole 134 (FIGS. 11 and 12) for guiding the end of the screw 112. The plate 13 is provided at the opposite side of the top with a shoulder 135 for guiding the adjustable shunt 11.

On the top, the plate 13 is provided with two tenons 136, the oppositely-located vertical faces 137 of which are preferably rounded-off, as shown in FIG. 12. These two tenons 136, which are of non-magnetic material, are engaged in two slots 72 of the blade 7 (FIG. 6), which they guide during its rocking movement on the edge 31, and this eliminates any air-gap and its undesirable variations.

By way of example given purely as an indication, good results have been obtained by forming the stator in a single piece cut-out and bent in a ferro-nickel material having high permeability, the variable shunt being of Anhyster (a ferro-nickel alloy manufactured by Imphy Iron and Steel Works of France) and the blade of a stainless ferro-nickel alloy having a high permeability.

What I claim is:

1. An ultra-sensitive electro-magnetic tripping device comprising a stator of magnetic material, in the general shape of a U, having two legs and a base, a tripping coil surrounding one leg of said stator, a permanent magnet mounted in the interior of the U against the second leg of said stator with one pole against the base of the stator, a blade of magnetic material applied in its normal position against the extremities of the two legs of said stator, a spring disposed between said stator and said blade and tending to urge said blade to the position of release, and a shunt of magnetic material mounted slidably in an adjustable manner along said permanent magnet and parallel to the legs of said stator.

2. An electro-magnetic tripping device as claimed in claim 1, wherein the material of said shunt has an incremental permeability which decreases slightly with increasing field intensity such that the shunt counterbalances variation of the reluctance of the magnetic circuit formed by the stator and blade with respect to temperature, thus nullifying the thermal instability of the tripping device.

3. An ultra-sensitive electro-magnetic tripping device comprising a stator of magnetic material in the general shape of a U, having two legs and a base, a tripping coil surrounding one leg of said stator, a permanent magnet mounted in the interior of the U against the second leg of the stator with one pole against the base of said stator, a plate of non-magnetic material rigidly fixed to the stator and having two tenons placed on each side of the extremity of the second leg of the stator, a blade of magnetic material having two lateral slots in which are housed the two tenons of said plate, said blade being applied in the normal position against the extremities of the two legs of the stator, a spring between said stator and said blade urging said blade to a position of release, and a shunt of magnetic material mounted slidably in an adjustable manner along the permanent magnet and moving parallel to the legs of said stator.

4. An ultra-sensitive electro-magnetic tripping device comprising a stator of magnetic material in the general shape of a U, having two legs and a base, a tripping coil surrounding one leg of said stator, a permanent magnet mounted in the interior of the U against the second leg of the stator with one pole against the base of said stator, a plate of non-magnetic material rigidly fixed to the stator and having two tenons placed on each side of the extremity of the second leg of the stator, a blade of magnetic material having two lateral slots in which are housed the two tenons of the plate, said blade being applied in the normal position against the extremities of the two legs of the stator, a spring between the stator and the blade, said spring urging the blade to a position of release, and a shunt of magnetic material mounted slidably in an adjustable manner along the permanent magnet and parallel to the legs of the stator, the incremental permeability of said material of the shunt decreasing slightly with increasing field intensity such that the shunt counterbalances variation of the reluctance of the magnetic circuit formed by the stator and blade with respect to temperature thus nullifying thermal instability of said tripping device.

5. An electro-magnetic tripping device as claimed in claim 4, in which the stator is a single sheet of material with cut-out and bent portions.

6. An electro-magnetic tripping device as claimed in claim 4, in which the first leg of said stator has a width less than the base of the stator and is terminated by a narrowed portion of still smaller width, the second leg of said stator terminating in a narrowed portion of smaller width than the base of the stator, the adjustable sliding assembly of said shunt comprising a stirrup rigidly fixed to the shunt and a screw of the stator screwed into said stirrup, and a blade spring fast with the stator and applying said shunt against the permanent magnet, the plate being mounted on and locked to the second leg of the stator, the adjacent vertical faces of the two tenons of the plate being rounded.

7. An electro-magnetic tripping device as claimed in claim 6, in which the stator is of ferro-nickel with a high permeability, the shunt is of ferro-nickel which has slightly decreasing permeability with increasing field intensity, and the blade is of stainless ferro-nickel of high permeability, the plate being of thermo-plastic material.

References Cited
UNITED STATES PATENTS

| | | | |
|---|---|---|---|
| 2,245,230 | 6/1941 | Shaw | 335—182 X |
| 3,001,049 | 9/1961 | Didier | 335—182 X |

B. A. GILHEANY, Primary Examiner

R. N. ENVALL, JR., Assistant Examiner

U.S. Cl. X.R.

335—237, 268